Dec. 8, 1959  R. H. GEORGE  2,916,647
SPARK GAP IMPULSE GENERATOR
Filed March 18, 1959  3 Sheets-Sheet 2

INVENTOR.
ROSCOE H. GEORGE
BY
ATTORNEYS

Dec. 8, 1959  R. H. GEORGE  2,916,647
SPARK GAP IMPULSE GENERATOR
Filed March 18, 1959  3 Sheets-Sheet 3

INVENTOR.
ROSCOE H. GEORGE
BY
ATTORNEYS

United States Patent Office 2,916,647
Patented Dec. 8, 1959

2,916,647

SPARK GAP IMPULSE GENERATOR

Roscoe H. George, West Lafayette, Ind., assignor to the United States of America as represented by the Secretary of the Air Force Application March 18, 1959, Serial No. 800,350

6 Claims. (Cl. 313—149)

In recent years there has been a great need for the development of high power impulse sources for use in the testing of radio and radar equipment. The needs are for equipment of a simple character capable of generating impulses with pulse rates of at least 10,000,000 pulses per second and with a power output sufficiently high to at least 1500 mc. to be monitored directly with a power meter so as to serve as a driver for a random noise signal generator. Several approaches to the design of a suitable generator have been made, in one form by the dropping of charged drops of mercury on the central conductor of a coaxial line and various rotary spark gap devices. With the mercury drop method it is difficult to exceed a pulse rate of 200,000 pulses per second and obtaining a very high pulse rate with rotary spark gaps involves the use of very high rotational speeds.

In oscillograph studies of single stationary spark gaps discharging into the central conductor of a coaxial line, it was discovered that if the gap is made very small of the order of .004 of an inch with a heavy high resistance placed in series with the gap and a charging voltage of from 1500 to 3000 volts D.C. used as the charging voltage the discharge was in the form of pulses at a rate as high as 75,000 to 80,000 pulses per second, random in time and covering a very wide frequency spectrum. By use of as many as 195 such spark gaps connected in parallel to a high voltage D.C. source, air cooling the resistors, creating a flow of air or gas through the gaps and feeding the confined output of the gaps to the central conductor of a coaxial cable it is possible to reach a pulse rate of about 15,000,000 pulses per second and with a power output up to 3000 mc. suitable as a driver for a noise generator and in which the power output can be monitored.

More complete details of the invention will become apparent by reference to the detailed description hereinafter given and to the appended drawings in which.

Figure 1:
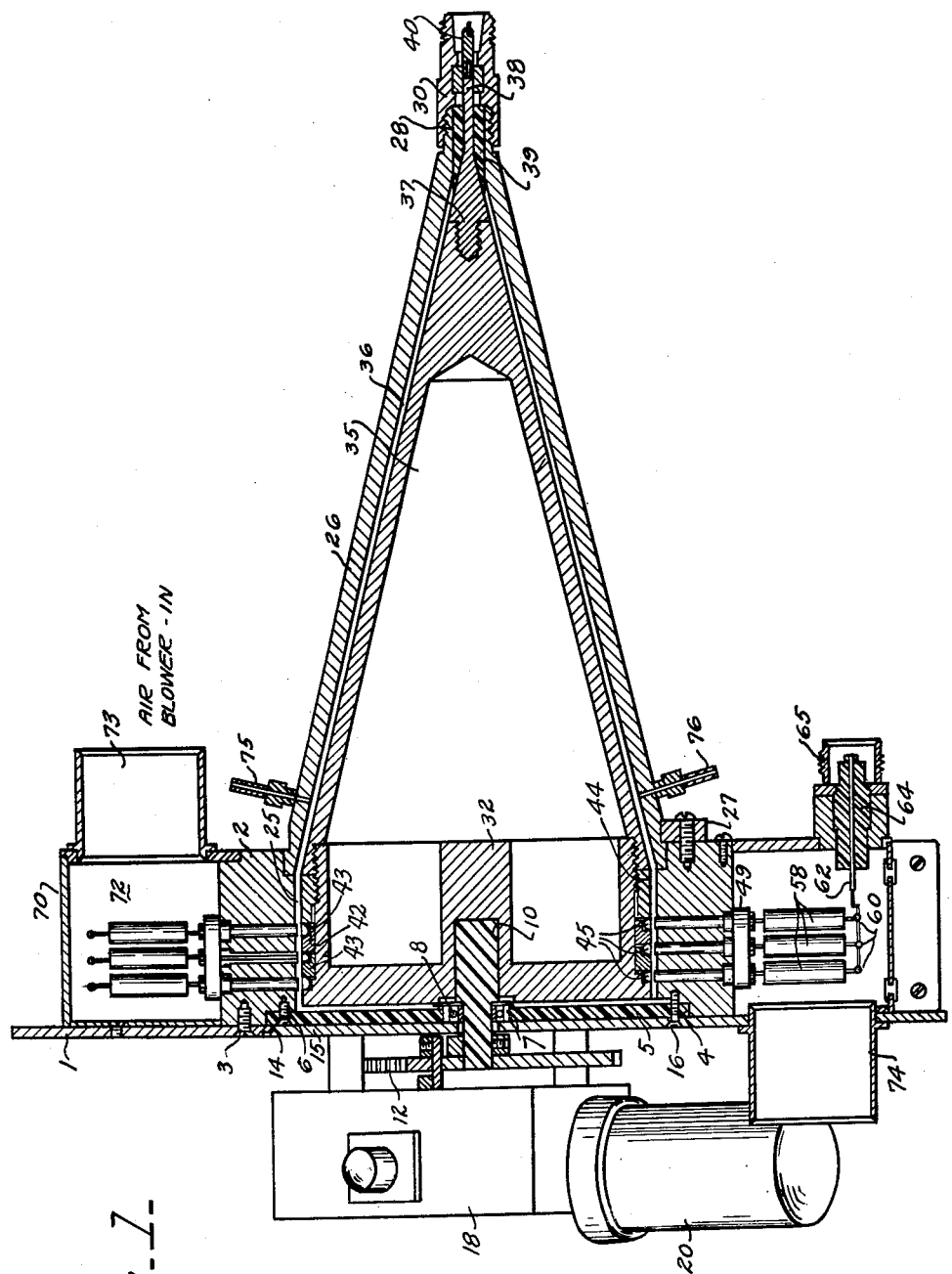
Fig. 1 is a longitudinal sectional view through an impulse generator in accordance with the invention.
Figure 2:
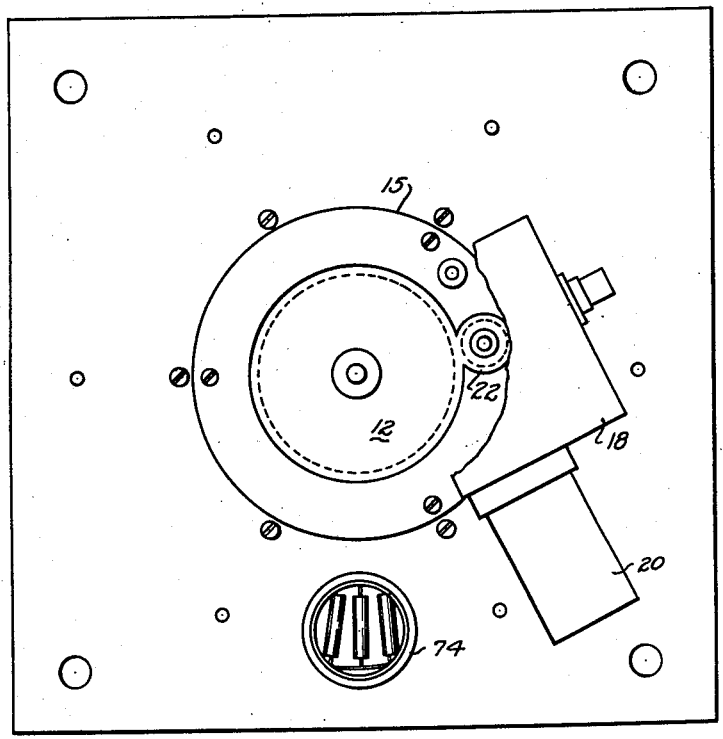
Fig. 2 is an end view of the generator.
Figure 3:
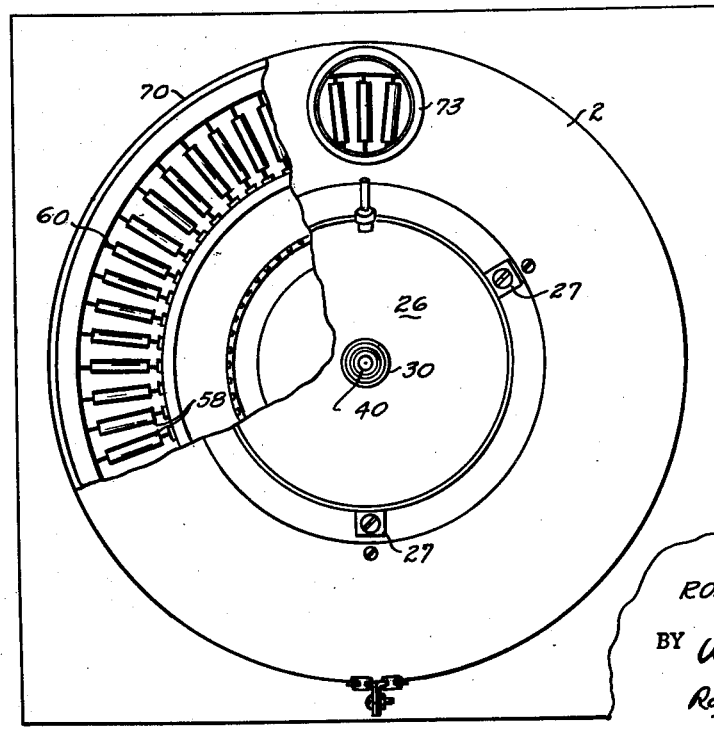
Fig. 3 is a view taken from the end opposite that of Fig. 2 and with parts broken out to show the resistors.

Referring now to Figs. 1, 2 and 3, the reference numeral 1 indicates a vertical rectangular support plate which, by means of longitudinal rods and a spaced end plate not shown, forms a supporting frame for the impulse generator assembly.

A thick annular aluminum ring 2 is centrally disposed on plate 1 and secured thereto by screws 3. The ring 2 is counterbored on its rear face as at 4 to receive a circular cover plate 5 made of a transparent insulating plastic material and secured to the ring 2 by screws 6. The plastic cover plate 5 is centrally bored at 7 into which the outer race of a ball bearing 8 is press fitted. The ball bearing 8 serves as a journal bearing for a shaft 10 made of an insulating material such as "Bakelite." The shaft 10 extends through the bearing 8 and has a gear 12 removably mounted on the outer end thereof. The mounting plate 1 is provided with a large central recessed bore 14 into which a cover plate 15 is secured by means of screws 16. The cover plate 15 is centrally apertured to clear the shaft 10 and serves as a mounting for a reduction gear drive and housing 18 driven by an electric motor 20. The reduction gear drive includes a pinion gear 22 which is adapted to drive gear 12 and shaft 10 at a slow constant speed of, for example, 25 r.p.m. The plate 15 with the motor drive can be removed so that the transparent cover plate 5 may be employed to view the spark gaps in operation.

The annular ring 2 has its central bore 25 closed at its outer end by a thick walled conical or funnel shaped member 26 which is removably fixed to the ring 2 by means of clamps 27. The funnel shaped member 26 terminates in a cylindrical threaded extension 28 to which the outer conductor of a coaxial line fitting 30 may be connected. The annular ring 2 and conical member 26 in effect constitute the outer conductor of a coaxial line.

A cylindrical metal rotor 32 is housed within the annular ring 2 and secured on the insulating shaft 10 for rotation thereby. The rotor 32 has removably secured thereto a metal cone 35 whose side walls lie parallel but uniformly spaced by an air gap 36 from the conical member 26. The cone 35 terminates in a tip portion 37 which has a spindle 38 formed on the outer end thereof. The tip 37 and spindle 38 are rotatably journalled in a polyfluorethylene plastic sleeve 39 which is pressed in the tubular extension 28 of the conical member 26 and serves both as a bearing and an insulator. The rotor 32, conical extension 35, tip 37 and spindle 38 form in effect the central conductor of a coaxial line and the tip of spindle 38 is adapted to rotate in a sleeve terminal 40 forming the central conductor of the coaxial line terminal fitting 30 to which a conventional coaxial cable or line may be connected to feed the noise current to an amplifier or other instrumentality for utilization.

Figure 4:
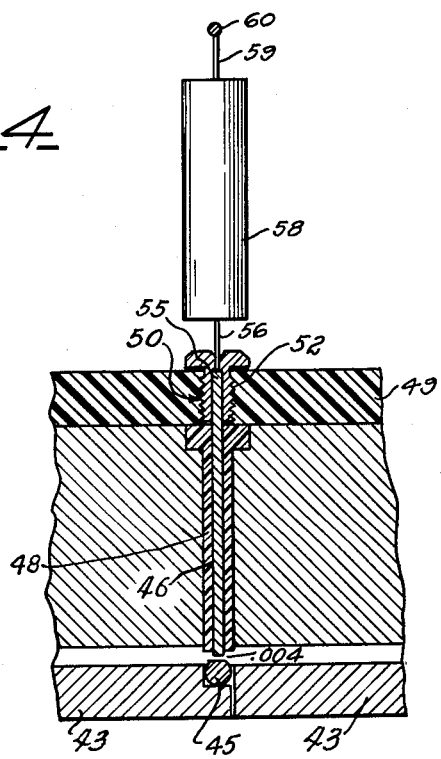
Fig. 4 is an enlarged sectional view showing the construction of the spark gap electrodes.

The periphery of the drum 32 is shouldered as at 42 which serves to support a pair of metal spacing rings 43 and a clamping ring 44 threaded onto the drum 32. The spacing rings 43 and clamping ring 44 serve to retain three molybdenum contact rings 45 in assembled spaced relation (see Fig. 1). The molybdenum rings 45 serve as spark gap electrodes to conduct current into the coaxial line central conductor formed by drum 32, conical extension 35 and spindle 38 and coaxial line conductor contact 40. The annular ring or body member 2 is provided with a row of radial equally spaced drilled passages 46, there being sixty-five such passages in each row or one hundred ninety-five in all. Each of the passages 46 are counterbored at their upper ends and a polyfluorethylene plastic sleeve 48 is pressed into each passage with an enlarged head portion of the sleeve seated in the counterbore of the passage 46 (see Fig. 4). A plastic insulating ring 49 is pressed on the outer periphery of the ring 2 and provided with drilled and threaded passages 50 aligned with each of the passages 46 and into which an adjusting sleeve 52 is threaded.

A tungsten rod 55 is pressed into each adjusting sleeve 52 and extends through the corresponding insulating sleeve 48 and projects therefrom to form a spark gap with the molybdenum ring 45 in alignment therewith. The spark gap electrode, rod 55 may be radially adjusted by turning the associated adjusting sleeve 52 to fix the spark gap at about .002 to .004 inch. As seen again in Fig. 4 each central electrode is connected to one terminal 56 of a 4.5 megohm deposited carbon resistor 58 the upper terminals 59 of which are connected to a circular conductor 60. It is thus seen that there are three rows of spark gaps with sixty-five spark gaps in each row, all of the gaps in each row being connected in parallel. Each of the three conductor rings 60 are connected in parallel to a common high voltage input conductor 62 positioned in an insulating bushing 64 forming part of an input connector plug 65 mounted in the wall of an annular housing generally indicated by the reference numeral 70.

The annular housing 70 is removably secured to the ring 2 and encloses the assembly of resistors 58 within an air cooling chamber 72 which is provided with an inlet conduit 73 and an outlet conduit 74 whereby air under relatively low pressure from a blower, not shown, may flow over the resistors 58 to dissipate the heat load therein which may exceed 250 watts and requires an air flow of the order of forty cubic feet per minute.

The gas forming the dielectric in the spark gaps has some effect on the pulse frequency and carbon dioxide appears to give very good results although air or oxygen may be used. The gas is admitted to the air space 36 by means of an inlet conduit 75 adapted to be connected by a conduit not shown, to a regulated supply of gas under pressure. Gas is discharged from the air space 36 by means of a vent line 76 to the atmosphere. Gas flow should be of the order of two to four liters per minute at a pressure of a few inches of water above atmospheric pressure. The gas flow continually flushing out the space adjacent the spark gap reduces the deionization time and increases the pulse frequency of each gap.

*Operation*

Figure 5:
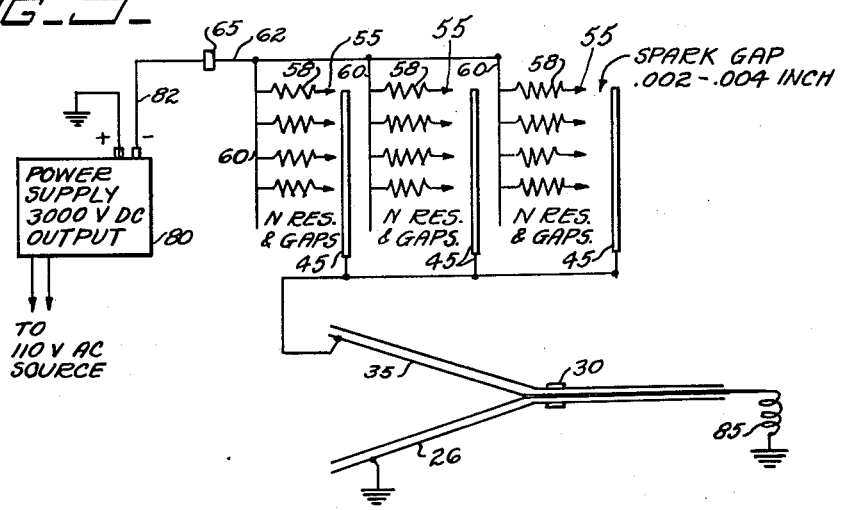
Fig. 5 is a schematic circuit diagram.

The schematic electrical circuit of a device in accordance with the invention is shown in Fig. 5 in which the input power supply is generally indicated by the reference numeral 80 and is adapted to convert 110 V.A.C. input current to a D.C. output of from 2000 to 3000 volts and a current of the order of 110 milliamperes. It is essential that the power supply D.C. output have not more than one percent ripple. Where the spark gap setting is made .002 inch the D.C. charging voltage may be as low as 2000 volts but best results have been attained with a voltage of 3000 volts and a spark gap setting of .004 inch. The current resistors may be made from 2 to 4.5 megohms. The negative terminal of the power supply output 80 is connected by a conductor 82 to the high voltage input terminal 62 of the noise generator. The conductor 62 is connected in parallel to each of the three conductor rings 60 each of which in turn is connected in parallel with a row of N resistors 58 each of which is connected to a spark gap electrode 55 which discharges to a common electrode 45 which is a molybdenum ring as heretofore described. The rings 45 are electrically connected in parallel to the conical conductor 35 which as previously described forms the center conductor of a coaxial line which preferably terminates in an inductive load such as the coil winding 85 impedance matched to the coaxial line. In effect each load resistor 58 and spark gap formed by electrodes 55 and 45 form a relaxation oscillator of the resistance-capacitance type, the resistance being the curent limiting resistance 58 and the capacitance being furnished by the interelectrode and stray capacity effects. Such an RC oscillator when connected to the high voltage D.C. source builds up a voltage across the spark gap until the gap resistance breaks down and a spark discharge occurs and due to the current limiting resistance is rapidly extinguished. Tests have indicated that the oscillation frequency of a single gap is of the order of 100,000 cycles per second with a 4.5 megohm current limiting resistance in series with a .004 inch spark gap and 3000 volt charging voltage. In accordance with the invention there are 195 such relaxation oscillators feeding current pulses into the center electrode of a coaxial line. Due to the fact that minute differences in gap spacing and electrical characteristics of each current limiting resistance and the capacitance effects vary the gaps do not fire simultaneously but in random order. Theoretically a device in accordance with the invention should, neglecting coincidence, develop about 19,000,500 pulses per second. Test using an oscillograph indicated an average pulse rate of 14,900,000 pulses per second using carbon dioxide gas as the spark gap atmosphere. The pulse repetition frequency varies with charging voltage, gap dimensions and nature of the gas surrounding the spark gaps. It appears that by increasing the number of gaps the pulse frequency could be raised without difficulty to the order of 20,000,000 pulses per second. Coincidences and the limiting deionization time of the gaps, of course, puts an operative limit to the pulse frequency which could be attained. Where the impulse frequency desired is lower than 10 to 15 x 10 to the sixth power any desired number of spark gaps may be employed.

In actual operation the cooling air supply is connected to the air inlet conduit 73 and the inlet of gas to inlet 75 is commenced and the motor 20 is energized to rotate drum 32 at a low speed. The rotation of this drum along with molybdenum spark gap electrode rings 45 prevents the sparking from eroding the ring electrodes. The high voltage power supply 80, Fig. 5, is then energized. As each gap fires the current impulse is fed to the central electrode of the coaxial line elements 35 and 26 and ultimately appears as a random noise output in the load coil or other termination 85 which may be coupled to an amplifier to form a high power noise generator. Since the output high frequency power is considerable the output of the generator can be measured and for many purposes can be used directly.

Having now described my invention what I wish to secure by United States Letters Patent is:

1. A high pulse rate impulse generator for developing electrical impulses having a random noise spectrum comprising means forming a coaxial line having an inner and an outer conductor, means providing a large number of individual spark gaps each having a pair of electrodes spaced by a gap of the order of from two to four one thousandths of an inch, one electrode of each gap being electrically connected to one of the conductors of said coaxial line, a source of high voltage direct current, an individual current limiting resistance connected to the other electrode of each spark gap, means connecting each of said current limiting resistances in parallel to said high voltage source of direct current, each spark gap when discharging feeding a current pulse into said coaxial line.

2. A high pulse rate impulse generator for developing electrical impulses having a random noise spectrum comprising a coaxial line having an inner and outer conductor, a plurality of relaxation oscillators each connected in parallel to the inner conductor of said coaxial line, each oscillator including a current limiting resistor and a spark gap connected in series and means for supplying a direct current high voltage potential to each of said relaxation generators.

3. A high pulse rate electrical impulse generator suitable as a noise source comprising concentric conductors forming a coaxial line, a high voltage direct current source having one side thereof connected to one of the conductors of said coaxial line, a plurality of electrodes spaced to form spark gaps one side of which are connected in parallel to the central conductor of said coaxial line, an individual current limiting resistor connected to the other electrode of each spark gap, means for connecting the other side of said direct current source in parallel to each current limiting resistor.

4. A high pulse rate electrical impulse generator adapted for use as an electrical noise source comprising a cylindrical annular metal housing closed at its outer end a conical metal extension secured to the open end of said housing and concentric with the longitudinal axis of the housing, said conical extension terminating in a fitting adapted to be coupled to the outer conductor of a coaxial line, a cylindrical rotor mounted in said housing with the periphery thereof parallel and spaced from the inner circumferential wall of the housing, a conical extension on said rotor having its outer periphery parallel and spaced from the extension of said housing, said rotor extension terminating in a central spindle adapted to be electrically connected to the central conductor of said coaxial line, said rotor and extension being electrically insulated from said housing and housing extension, at least one conducting ring mounted on said rotor and electrically connected thereto, at least one row of equally spaced radial electrodes extending through said housing in the plane of said conducting ring and spaced and insulated therefrom to form a series of individual spark gaps, a plurality of current limiting resistors each connected to a respective radial electrode, a source of high voltage direct current connected in parallel to each of said resistors, and means for applying a flow of cooling air to said resistors to cool the same, and means for rotating said rotor and conducting ring.

5. The structure as claimed in claim 4, in which means are provided for passing a stream of gas through said spark gaps.

6. The structure as claimed in claim 4, in which the setting of the spark gaps are all alike and within the range of .002 to .004 inch, the current limiting resistances being selected all alike and within the range of two to about four and one half megohms and the direct current charging voltage being from two to three thousand volts direct current.

References Cited in the file of this patent
UNITED STATES PATENTS 1,567,978    Niece _____ Dec. 29, 1925